United States Patent Office 3,072,381
Patented Jan. 8, 1963

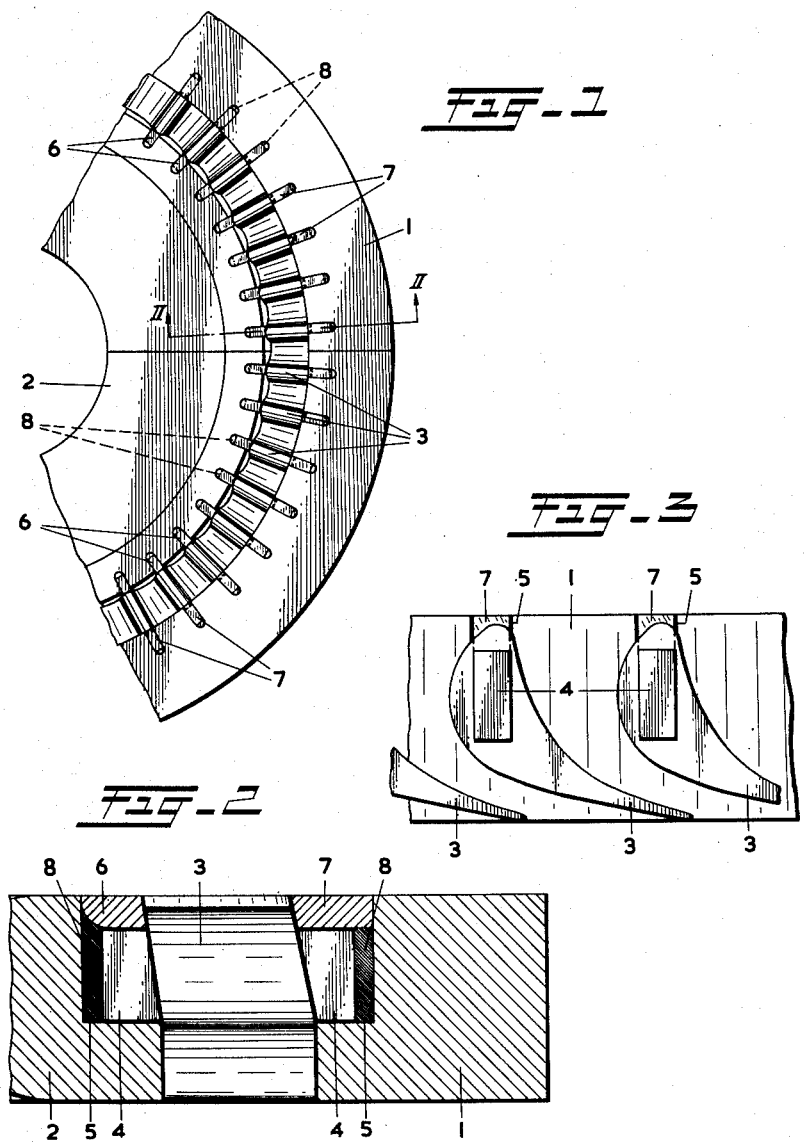

3,072,381
NOZZLE OR GUIDE BLADE SUPPORTING STRUCTURE WITH NOZZLES OR GUIDE BLADES FOR A TURBINE AND METHOD FOR ASSEMBLING SUCH PARTS
Herman Laméris, Naarden, Netherlands, assignor to Werkspoor N.V., Amsterdam, Netherlands, a corporation of the Netherlands
Filed Sept. 6, 1960, Ser. No. 54,015
Claims priority, application Netherlands May 9, 1960
3 Claims. (Cl. 253—78)

This invention relates to a nozzle or guide blade supporting structure with nozzles or guide blades for a turbine, in which the nozzle partitions or blades engage with protruding parts in recesses in the supporting structure and are secured thereto by brazing, and to a method for assembling such parts.

Beside brazed connections it is known to make the connections in such structures by casting, riveting or welding.

All known structures involve complications. Particularly in welded and cast connections there should be a considerable surplus of material on the inner and/or outer rings of the supporting structure, such as the nozzle diaphragm, to allow accurate finishing by machining to the desired ultimate shape and dimensions. Often expensive patterns and molds are required; special punching tools have sometimes to be used, and there is a lack of dimensional accuracy unless very expensive structures are chosen. Sometimes leakages occur between the nozzles or guide blades on the one hand and the supporting structure on the other hand.

It is an object of this invention to improve such structures.

To this effect a structure as indicated in the preamble is characterized in that the protruding parts of the nozzle partitions or blades engage conformingly along at least three sides in the recesses in the supporting structure and in that along a fourth side an extra space is left in the recesses, which is filled with brazing material, which material also fills the narrow slits between the protruding parts and the nozzle partitions or blades on the one hand and the supporting structure on the other hand.

A method for assembling such supporting structure to such nozzles or guide blades is according to this invention characterized in that brazing material is introduced into the said extra spaces in the recesses in the supporting structure along the said fourth side of the protruding parts of the nozzle partitions or blades and in that the assembly of supporting structure and nozzle partitions or blades thus assembled is thereupon heated to a temperature above the melting point of the brazing material, so that this material creeps through the narrow slits between the protruding parts and the nozzle partitions or blades on the one hand and the supporting structure on the other hand.

Not only the disadvantages as described above for the known structures are thus avoided, but moreover it is possible to obtain a high degree of accuracy as to size and dimensions, which cannot at all be obtained in the known structures or can only be obtained therein after expensive and cumbersome or complicated machining or similar operations. Moreover with the same axial thickness of the diaphragms or similar structures and with the same thickness of the nozzle partitions or blades in general a more rigid structure is obtained than in the known arrangements.

Moreover the invention opens the possibility of applying a heat-treatment to the assembled structure in the same oven immediately after the brazing, which brazing preferably takes place as brazing in an oven enclosing the entire structure, e.g. by the so-called nicrobrazing-method and it is possible therein to obtain and to maintain a clean surface of all parts without solder having to be removed after the brazing and annealing.

This invention will now be explained further with reference to the annexed drawings. In said drawings:

FIGURE 1 is a partial axial elevation of a nozzle diaphragm with nozzles for an axial turbine according to the present invention;

FIGURE 2 is a cross-section in an axial plane and on a larger scale along the line II—II in FIGURE 1 and FIGURE 3 is a diagrammatic radial view of nozzle partitions with the adjacent part of the supporting structure or diaphragm.

The nozzle supporting structure or diaphragm according to FIGURE 1 comprises an outer ring 1 and an inner ring 2, between which the nozzle partitions 3 are provided. Said nozzle partitions may be manufactured from profiled rods so that they obtain protruding parts or cams 4, e.g. obtained by milling, said parts 4 fitting in corresponding recesses or slots 5 in the inner and outer rings of the diaphragm. The position of the slots and the position between the slots are for each nozzle determining the outlet angle thereof and the cross-section of the throat of the nozzles of the row.

Two fillers or small closing plates 6 and 7 are provided for each nozzle partition to close the slots or recesses 5 both in the inner and the outer ring. The slots 5 are deeper than the protruding parts 4 (in this case by manufacturing the slots with an endmill which gives a shape as shown in FIGURE 1 in the deepest parts of the recesses). In the spaces 8 thus remaining between the end faces of the protruding parts 4 and the bottom of the slots a quantity of brazing material (e.g. composed of Ag—Cu—Ni or Ni—Cr) or other suitable heat fusible bonding material is introduced. During the brazing process now taking place, which could be ovenbrazing or nicrobrazing or a brazing-method similar to diffusion welding the brazing material will creep entirely in the remaining slits between the nozzle partitions and the inner and the outer ring (vide FIGURE 2) and will constitute a solid and reliable connection between said parts, which connection is both steamtight and moreover sufficiently rigid and strong to withstand the forces occurring as a result of pressure differences between both sides of the diaphragm in operation of the turbine.

By the oven-brazing or nicrobrazing or diffusion welding process it is not necessary to machine the inner and the outer ring after making the connection between the parts. A further heat-treatment such as annealing could take place in the same oven in which the brazing takes place.

What I claim is:

1. A nozzle ring assembly comprising a pair of relatively concentric supporting rings radially spaced to define an annular gap therebetween, said rings being formed respectively with a plurality of separate pairs of radially opposed recesses, the recesses of each pair opening radially toward each other into said annular gap and also opening in a common axial direction through one axial end face of the respective rings, each said recess having a closed end in the other axial direction, blade supports received with clearance in the respective recesses of each said pair, each said blade support terminating short of the radial end of its respective recess remote from said gap to leave between it and said end a space of uniform axial cross-sectional shape and dimension for reception of a heat fusible bonring material, a heat fusible bonding material disposed in each said space, a plurality of blades, each extending across said annular gap between the said supports within each said pair of radially opposed recesses and fixedly secured to said supports, said supports normally resting on the closed ends of said recesses and spaced below the said one axial end face of said rings.

2. The combination of elements as defined in claim 1 wherein clearance space is provided both between the said supports and the closed ends of their respective recesses and between each said support and its associated blade, whereby said bonding material when fused may flow around said support and between said support and its blade to bond the two together.

3. The combination defined in claim 1 including closing plates occupying and completely closing the open ends of said recesses for confining the said bonding material against axial escape.

References Cited in the file of this patent

UNITED STATES PATENTS

| | | |
|---|---|---|
| 1,470,507 | Steistrup | Oct. 9, 1923 |
| 1,713,173 | Dickinson | May 14, 1929 |
| 2,196,062 | Doran | Apr. 2, 1940 |
| 2,299,449 | Allen | Oct. 20, 1942 |
| 2,777,666 | Corr et al. | Jan. 15, 1957 |

FOREIGN PATENTS

| | | |
|---|---|---|
| 505,233 | Great Britain | May 8, 1939 |